United States Patent
Ljung

(10) Patent No.: US 10,631,230 B2
(45) Date of Patent: Apr. 21, 2020

(54) NETWORK CONTROLLED EXTENDED ACCESS BARRING FOR USER DEVICES

(71) Applicant: Sony Mobile Communications Inc., Tokyo (JP)

(72) Inventor: Rickard Ljung, Helsingborg (SE)

(73) Assignee: Sony Corporation, Tokyo (JP)

( * ) Notice: Subject to any disclaimer, the term of this patent is extended or adjusted under 35 U.S.C. 154(b) by 164 days.

(21) Appl. No.: 15/973,923

(22) Filed: May 8, 2018

(65) Prior Publication Data
US 2018/0255501 A1    Sep. 6, 2018

Related U.S. Application Data

(63) Continuation of application No. 14/972,171, filed on Dec. 17, 2015, which is a continuation of application No. 13/995,311, filed as application No. PCT/IB2012/052058 on Apr. 24, 2012, now Pat. No. 9,253,709.

(51) Int. Cl.
*H04W 48/02* (2009.01)
*H04W 48/06* (2009.01)
*H04W 72/14* (2009.01)
*H04W 8/18* (2009.01)
*H04W 4/70* (2018.01)

(52) U.S. Cl.
CPC ............ *H04W 48/02* (2013.01); *H04W 8/18* (2013.01); *H04W 48/06* (2013.01); *H04W 72/14* (2013.01); *H04W 4/70* (2018.02)

(58) Field of Classification Search
CPC ..... H04W 48/06; H04W 48/10; H04W 48/02; H04W 4/005; H04W 48/08; H04W 12/08; H04W 48/16; H04W 48/12; H04W 72/14

USPC ...... 455/410, 411, 414.1, 558; 370/230, 252
See application file for complete search history.

(56) References Cited

U.S. PATENT DOCUMENTS 8,761,138 B2 *  6/2014  Moisanen ............ H04W 76/18
                                                     370/338
2009/0318109 A1   12/2009  Kroselberg
(Continued)

FOREIGN PATENT DOCUMENTS

| JP | 2010-501131 | 1/2010 |
|---|---|---|
| WO | 2011008498 | 1/2011 |
| WO | 2011043950 | 4/2011 |

OTHER PUBLICATIONS

Jain et al., "Machine Type Communications in 3GPP Systems," IEEE Communications Magazine, Nov. 2012, pp. 28-35.
(Continued)

*Primary Examiner* — Allahyar Kasraian
(74) *Attorney, Agent, or Firm* — Tucker Ellis LLP

(57) ABSTRACT

A method includes determining, by a data use device in a network, whether the data use device follows a non-extended access barring (EAB) network access protocol for a first service and an EAB network access protocol for a second service. The method further includes determining, by the data use device, whether EAB access has been granted in the network. Upon determining that EAB access has not been granted, the data use device bars network access requests of the second service and allows network access requests of the first service. Upon determining that EAB access has been granted, the data use device allows all network access requests.

20 Claims, 6 Drawing Sheets

(56) References Cited

U.S. PATENT DOCUMENTS

| | | | |
|---|---|---|---|
| 2010/0074170 A1* | 3/2010 | Chen | H04W 48/20 370/328 |
| 2010/0151851 A1 | 6/2010 | Bhatia | |
| 2010/0197294 A1 | 8/2010 | Fox | |
| 2011/0201307 A1 | 8/2011 | Segura | |
| 2012/0040643 A1 | 6/2012 | Diachina | |
| 2013/0040597 A1 | 2/2013 | Jang | |
| 2013/0121225 A1 | 5/2013 | Ryu | |
| 2013/0294396 A1* | 11/2013 | Iwamura | H04W 72/04 370/329 |
| 2014/0036669 A1 | 2/2014 | Yang | |

OTHER PUBLICATIONS

3GPP TSG-RAN WG2 #74, R2-113030, "Extended Access Barring for MTC Devices," Barcelona, Spain, May 9-13, 2011, 3 pages.

3GPP TSG CT WG1: "Reply LS on EAB Requirements," 3GPP Draft; R2-115663 C1-114451, Nov. 14-18, 2011, 2 pages.

3GPP TSG-RAN WG2 #76, R2-116039, Ericsson et al., "UE AS-NAS Model for EAB," San Francisco, CA, Nov. 14-18, 2011, 5 pages.

International Search Report and Written Opinion from corresponding International Application No. PCT/IB2012/052058, dated Apr. 23, 2013.

3GPP Standard; 3GPP TS 23.401, V11.1.0, 3rd Generation Partnership Project; Technical Specification Group Services and System Aspects; General Packet Radio Service (GPRS) enhancements for Evolved Universal Terrestrial Radio Access Network (E-UTRAN) access (Release 11), Mar. 2012, Excerpt pp. 1-45 and 81-92.

3GPP TSG SA WG2 #90, TD S2-121276, Huawei et al., "About Dual-Priority UEs," Bratislava, Slovakia, Apr. 16-20, 2012 6 pages.

3GPP TSG RAN WG2 #75bis, R2-114957, ZTE, "Update of EAB Parameters," Zhuhai, China, Oct. 10-14, 2011, 4 pages.

3GPP TSG SA WG2 Meeting #90, TD S2-121565, Nokia Siemens Networks et al., "Dual Priority," Bratislava, Slovakia, Apr. 16-20, 2012, 5 pages.

3GPP TSG-RAN WG2 Meeting #75b, R2-115171, LG Electronics Inc., "Is EAB Enough to Control RACH Overload?" Zhuhai, China, Oct. 10-14, 2011, 4 pages.

Extended European Search Report from corresponding European Application No. EP 16153779.0, dated May 6, 2016.

3GPP Technical Specification, 3GPP TS 22.011, V11.2.0, Dec. 21, 2011.

3GPP TSG-RAN WG3 #75bis, R3-120765, Alcatel-Lucent, "CN Overload Control of Traffic Subject to EAB," San Jose del Cabo, Mexico, Mar. 26-30, 2012, 3 pages.

3GPP TSG-RAN WG2 Meeting #75, R2-114343, Renesas Mobile Europe, "Implementing Enhanced Access Barring in UMTS and LTE," Athens, Greece, Aug. 22-26, 2011, 5 pages.

* cited by examiner

NETWORK CONTROLLED EXTENDED ACCESS BARRING FOR USER DEVICES

RELATED APPLICATION DATA

This application is a continuation of U.S. patent application Ser. No. 14/972,171, filed Dec. 17, 2015, which claims the benefit of and is a continuation of U.S. patent application Ser. No. 13/995,311, filed Jun. 18, 2013, which claims the benefit of and is a national stage application of PCT application number PCT/IB2012/052058, filed on Apr. 24, 2012. The aforementioned applications are hereby incorporated herein by reference.

BACKGROUND

Data traffic in mobile communication networks are increasing over time due to several reasons. One aspect that can result in a significantly higher amount of data traffic in the networks is the trend of increased amount of data centric machine-to-machine (M2M) devices being connected to mobile communication systems. Examples of such M2M devices can be, e.g., in the areas of transportation, health care, manufacturing, retail etc.

SUMMARY

In one implementation, a computer-implemented method may include determining whether a network access class associated with a data use device is a mixed access class, wherein the mixed access class includes a non-extended access barring (EAB) network access protocol for at least one service and an EAB network access protocol for at least one other service, determining whether EAB access has been granted for the data use device to access a network, barring EAB network access for the data use device if EAB access has not been granted for the data use device to access the network, and allowing network access for all services for the data use device if EAB access has been granted for the data use device to access the network.

In addition, the computer-implemented method may further include updating the network access class associated with the data use device if a new network access class is received.

In addition, determining whether the network access class associated with the data use device is a mixed access class may further include determining the network access class based on a subscriber identity module (SIM) associated with the data use device.

In addition, the at least one service may be a time-critical service and the at least one other application may be a non-time critical service.

In addition, the computer-implemented method may further include coordinating a separate packet data protocol (PDP) context for each network access protocol.

In addition, the computer-implemented method may further include assigning a separate random access channel for services following the EAB network access protocol.

Additionally, the network may be a third generation partnership project (3GPP) network.

According to another implementation, a data use device may include a memory to store a plurality of instructions, and a processor configured to execute instructions in the memory to generate a request for network access based on at least one service associated with the data use device, receive a request for an identification of a network access class associated with the data use device, provide an identification of a mixed access class associated with the device in response to the request for the identification of the network access class associated with the data use device, wherein the mixed access class includes a non-EAB network access protocol for at least one service and an EAB network access protocol for at least one other service, and receive network access based on the mixed access class and the at least one service.

In addition, the data use device may be one of a wireless telephone, a cellular telephone, a smart phone, a personal digital assistant (PDA), a laptop computer, a personal computer, or a tablet computer.

In another implementation, a device may include a memory to store a plurality of instructions, and a processor configured to execute instructions in the memory to determine whether a network access class associated with a data use device is a mixed access class, the mixed access class allowing full network access for time critical services and network access based on machine type communication for non-time critical services, determine whether access has been granted for machine type communications in a network, bar network access for machine type communications by the data use device if network access for machine type communications has not been granted for the network, and allow network access for all services for the data use device if network access for machine type communications has been granted for the network.

In addition, the processor is further to update the network access class associated with the data use device if a new network access class is received.

In addition, when determining whether the network access class associated with the data use device is a mixed access class, the processor is further to determine the network access class based on a subscriber identity module associated with the data use device.

In addition, the processor is further to coordinate a separate packet data protocol (PDP) context for each network access protocol.

In addition, the processor is further to assign a separate random access channel for services that receive network access based on machine type communication for non-time critical services.

In addition, the network is a third generation partnership project (3GPP) network.

In another implementation, a computer-readable medium including computer-executable instructions, the computer-executable instructions may include instructions to determine whether a network access class associated with a data use device is a mixed access class. The mixed access class includes a non-extended access barring (EAB) network access protocol for at least one service and an EAB network access protocol for at least one other service. The computer-executable instructions may include instructions to determine whether EAB access has been granted for a network. The computer-executable instructions may also include instructions to bar EAB network access for the data use device if EAB access has not been granted for the network and to allow network access for all services for the data use device if EAB access has been granted for the network.

In addition, when determining whether the network access class associated with the data use device is a mixed access class, the computer-readable instructions include instructions to determine the network access class based on a subscriber identity module (SIM) associated with the data use device.

In addition, the computer-readable instructions include instructions to update the network access class associated with the data use device based on the SIM associated with the data use device if a new network access class is received.

In addition, the computer-readable instructions further include instructions to coordinate a separate packet data protocol (PDP) context for each network access protocol.

In addition, the computer-readable instructions further include instructions to assign a separate random access channel for services following the EAB network access protocol.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION

The following detailed description refers to the accompanying drawings. The same reference numbers in different drawings may identify the same or similar elements. Also, the following detailed description is exemplary and explanatory only and is not restrictive of the invention, as claimed.

Embodiments described herein relate to devices, methods, and systems for providing terminal controlled access of data use devices (e.g., a consumer terminal) to networks based on control planes that include extended access barring (EAB) and non-EAB network access classes. A same network terminal may allow for time critical activities to be allowed in a data use device while non-time critical background activities follow machine type communication, lowering the risk for network congestion.

Figure 1:
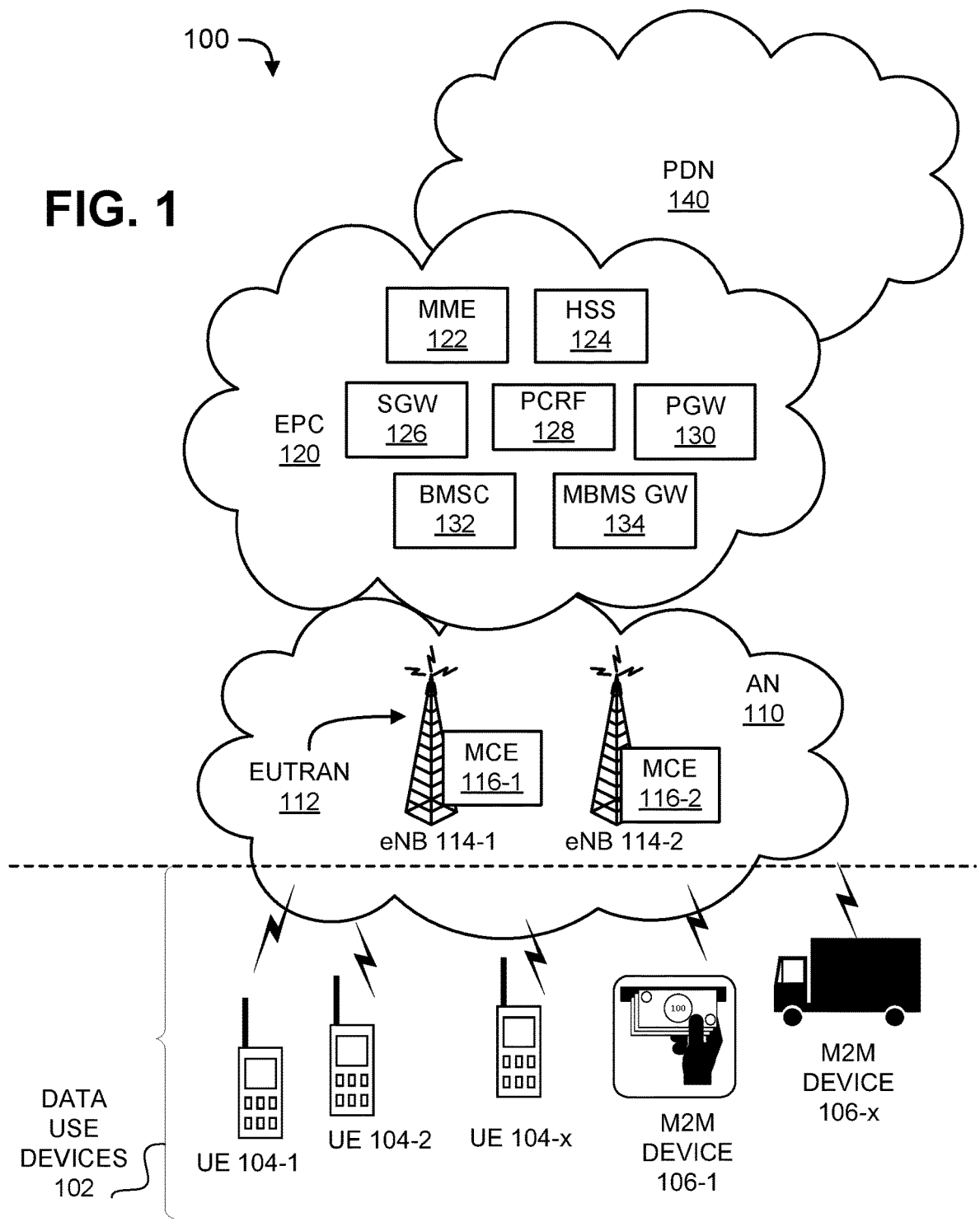
FIG. 1 is an exemplary long term evolution (LTE) network in which systems and/or methods described herein may be implemented.

FIG. 1 is a diagram of an exemplary LTE network 100. As illustrated, LTE network 100 includes a number of data use devices 102, an access network (AN) 110, an evolved packet core (EPC) network 120, and a packet data network (PDN) 140, such as the Internet or a proprietary packet data network.

Data use devices 102 may include a number of user equipment (UE) devices 104-1, 104-2 and 104-x (collectively referred to as UEs 104 or individually as UE 104), and a number of machine-to-machine (M2M) devices 106-1, and 106-x (collectively referred to as M2Ms 106 or individually as M2N 106). As described herein, data use devices 102 may transfer data in network 100 based on particular network access classes associated with particular data use devices 102.

UE 104 may include a radiotelephone, a personal communications system (PCS) terminal (e.g., that may combine a cellular radiotelephone with data processing and data communications capabilities), a wireless telephone, a cellular telephone, a smart phone, a personal digital assistant (PDA) (e.g., that can include a radiotelephone, a pager, Internet/intranet access, etc.), a laptop computer, a personal computer, a tablet computer, or other types of computation or communication devices. In an exemplary implementation, UEs 104 may include any device that is capable of communicating over AN 110, EPC network 120, and/or PDN 140. UE 104 may operate according to one or more versions of the LTE communication standard, for example. As described herein, UEs 104 may include indicators that may be used (by a network terminal in network 100) to determine network access classes that particular network access requests belong to, and to consequently receive access to network 100 based on control planes that include either extended access barring (EAB) and non-EAB for the particular requests.

M2M 106 may include a device that communicates in network 100 using machine type communications (MTC) (e.g. machine-to-machine communications (i.e., machine type communications) such as described in third generation partnership project (3GPP) technical report (TR) 37.868). One fundamental aspect of communication among M2M devices, such as M2Ms 106 described herein, is that communication is typically made without human intervention, making the requirements less stringent in terms of low latency for connection setups, etc., for M2M connections. M2M 106 may be a device (such as a sensor or meter) that includes capability to capture data regarding one or more events or conditions (such as temperature, inventory level, fuel level, etc.), and relay the data through network 100 to an application (machine-readable instructions) at another device (e.g., a network terminal, etc.), that may translate the data into information that may be used to manage M2M 106 or conditions associated with M2M 106 (e.g., items to be restocked, temperature to be adjusted, etc.). In an exemplary implementation, M2M 106 may include any device that is capable of communicating using machine-to-machine communications over AN 110, EPC network 120, and/or PDN 140. M2M 106 may operate according to one or more versions of the LTE communication standard, for example.

AN 110 includes a communications network that connects subscribers (e.g., UE 104) to a service provider. In one example, AN 110 may include a Wi-Fi network or other access networks (e.g., in addition to E-UTRAN 112). AN 106 may include an evolved universal terrestrial radio access network (E-UTRAN) 112 and a number of eNodeBs (eNBs) 114-1 and 114-2 or enhanced node base stations (collectively referred to as eNBs 114 or individually as eNB 114). Each eNB 114 may include a corresponding multicast coordination entity (MCE) 116 (respectively MCE 116-1, 116-2 and 116-x, collectively referred to as MCEs 116 or individually as MCE 116).

E-UTRAN 112 includes a radio access network capable of supporting high data rates, packet optimization, large capacity and coverage, etc. E-UTRAN 112 may include a plurality of eNBs 14.

eNBs 114 includes network devices that operate according to one or more versions of the LTE communication standard. For example, eNBs 114 may be configured to respond to requests from data use devices 102, forward information regarding data use devices 102 to a mobility management entity (MME) 122 and/or a serving gateway (SGW) 126 in EPC 120, set up tunneling sessions with other devices (e.g., SGW 126), etc. eNBs 114 are base stations in network 100 and may include control plane connections to other network elements. eNBs 114 may include MCEs 116.

MCEs 116 may allocate radio resources used by all eNBs 114 in the multicast/broadcast single frequency network (MBSFN) area for multi-cell Multimedia Broadcast Multicast Service (MBMS) transmissions using MBSFN operations. The MBSFN area is a specific area in which multiple cells transmit the same content using a single frequency network. Each eNB 114 may have an associated MCE 116, which may be integrated into the eNB 114. Alternatively, MCEs 116 may be part of another network element. When the MCE 116 is part of another network element, each eNB 114 is served by a single MCE 116. In addition to allocation of the time/frequency radio resources, MCEs 116 may also determine or implement further details of the radio configuration, such as the modulation and coding scheme (MCS). The MCE may also be involved in MBMS session control signaling.

EPC 120 may include a core network architecture of the 3GPP LTE wireless communication standard. EPC 120 may include MME 122, a home subscriber server (HSS)/authentication, authorization, and accounting (AAA) server 124, a serving gateway (SGW) 126, policy and charging rules function (PCRF) device 128, a PDN gateway (PGW) 130, a broadcast multicast service center (BMSC) 132, and an MBMS gateway (MBMS GW) 134. Devices/networks of network 100 may interconnect via wired and/or wireless connections.

MME 122 is responsible for idle mode tracking and paging procedures (e.g., including retransmissions) for data use devices 102. For example, MME 122 maintains information regarding a current state (e.g., powered on, location, etc.) of a data use device 102. MME 122 is also involved in the bearer activation/deactivation process (e.g., for UE 104) and operates to choose a particular SGW 126 for data use device 102 at an initial attach time and at a time of intra-LTE handover. In addition, MME 122 authenticates data use devices 102 (e.g., via interaction with HSS 124). Non-access stratum (NAS) signaling terminates at MME 122 and MME 122 generates and allocates temporary identities to data use devices 102 (e.g., UE 104).

Furthermore, MME 122 may check authorization of data use devices 102 to connect to a service provider's Public Land Mobile Network (PLMN) and may enforce roaming restrictions for data use devices 102 (e.g., a particular UE 104). MME 122 may be a termination point in EPC network 120 for ciphering/integrity protection for NAS signaling and may handle security key management. MME 122 may provide a control plane function for mobility between LTE and second generation mobile telecommunications or third mobile generation telecommunications (2G/3G) 3GPP access networks with an S3 interface (i.e., an interface that provides the connection between a serving general packet radio service (GPRS) support node (SGSN) and MME 122 in an LTE network) terminating at MME 122. MME 122 may also terminate an S6a interface (which enables transmission of subscription and authentication data) towards HSS 124 for roaming UEs 104.

HSS/AAA 124 is configured to include a master user database that supports devices on PDN 140 that handle calls, such as proxy devices, session border controllers, etc. HSS/AAA 124 may contain subscription-related information (e.g., subscriber profiles), may perform authentication and authorization of a user based on requests received from MME 122, and may provide information about a subscriber's location and IP information.

SGW 126 routes and forwards user data packets, acts as a radio mobility anchor for a user plane during inter-eNB handovers, and also acts as a radio anchor for mobility between LTE and other 3GPP technologies (referred to as "inter-3GPP mobility"). As shown, SGW 126 is connected to eNBs 114 to provide a radio layer mobility control plane. In addition, SGW 126 manages and stores contexts associated with UE 104 (e.g., parameters of an IP bearer service, network internal routing information, etc.).

PCRF 128 provides policy control decision and flow based charging control functionalities. PCRF 128 may provide network control regarding service data flow detection, gating, quality of service (QoS) and flow based charging, etc. PCRF 128 may determine how a certain service data flow shall be treated, and may ensure that user plane traffic mapping and treatment is in accordance with a user's subscription profile.

PGW 130 includes one or more data transfer devices (or network devices), such as a gateway, a router, a switch, a firewall, a network interface controller (NIC), a hub, a bridge, a proxy server, an optical add/drop multiplexer OADM, or some other type of device that processes and/or transfers data. PGW 130 provides connectivity of data use devices 102 to external packet data networks (e.g., to PDN 140) by being a traffic exit/entry point for data use devices 102. As described briefly above, data use device 102 may connect to PGW 130 via one or more tunnels established between eNB 114 and PGW 130, such as one or more GPRS Tunneling Protocol (GTP) tunnels. Data use devices 102 may simultaneously connect to more than one PGW for accessing multiple PDNs. PGW 130 may perform policy enforcement, packet filtering for each user, charging support, lawful intercept, and packet screening. PGW 130 may also act as an anchor for mobility between 3GPP and non-3GPP technologies.

BMSC 132 may be a functional entity that manages provision of multicast services or broadcast services to data use device 102 and, in some instances, an associated end-user, such as currently implemented in 2G and 3G MBMS architectures. BMSC 132 may provide an entry point for content providers or other broadcast/multicast source which is external to the network. BMSC 132 may perform authorization, scheduling, and security procedures in support of the multicast services or broadcast services. For example, BMSC 132 may provide authorization for terminals requesting to activate an MBMS service. BMSC 132 may schedule broadcast/multicast sessions. BMSC 132 may also implement integrity and confidentiality protection of MBMS data and may issue MBMS session announcements.

BMSC 132 may support MBMS bearer signaling that sets up and releases context at the establishment and termination of MBMS sessions. BMSC 132 may also support user related signaling, e.g., for multicast session authorization, or user session joining or detaching from multicast sessions.

MBMS GW 134 may send/broadcast MBMS packets to each eNB 114 transmitting the (broadcast or multicast) service. MBMS GW 134 may be a logical entity that is present between BMSC 132 and eNBs 114 in network 100. MBMS GW 134 may be part of another network element, such as a router, etc. MBMS GW 134 may use IP multicast to forward MBMS user data to eNB 114. MBMS GW 134 may perform MBMS session control signaling (e.g., session start/stop) towards the E-UTRAN 112 via MME 122.

PDN 140 includes a network that provides data services (e.g., via packets or any other Internet protocol (IP) datagrams). For example, PDN 140 may include the Internet, an intranet, an asynchronous transfer mode (ATM) network, etc.

Three UEs 104, two M2M devices 106, AN 110, EPC 120, PDN 140, E-UTRAN 112, two eNBs 114, MME 122, HSS 124, SGW 126, PCRF 128, PGW 130, BMSC 132, and MBMS GW 134 have been illustrated in FIG. 1 for simplicity. In practice, there may be more or fewer devices or components. For example, a typical network 100 includes millions of subscriber UEs 104, thousands of eNBs 114, hundreds of SGWs 126 and several PGWs 130 and MBMS GWs 134 effectively forming a hierarchical access network in which traffic passes from PDN 140 to UE 104 via, for example, a particular MBMS GW 134, PGW 130, SGW 126, and eNB 114.

In implementations described herein, processes and methods of providing terminal controlled access of data use devices to networks, such as networks enabled with 3GPP specifications, based on control planes that include extended access barring (EAB) and non-EAB are disclosed. Further, functions described as performed by any one device may be performed by any other device (or combination of devices) in network 100.

Figure 2:
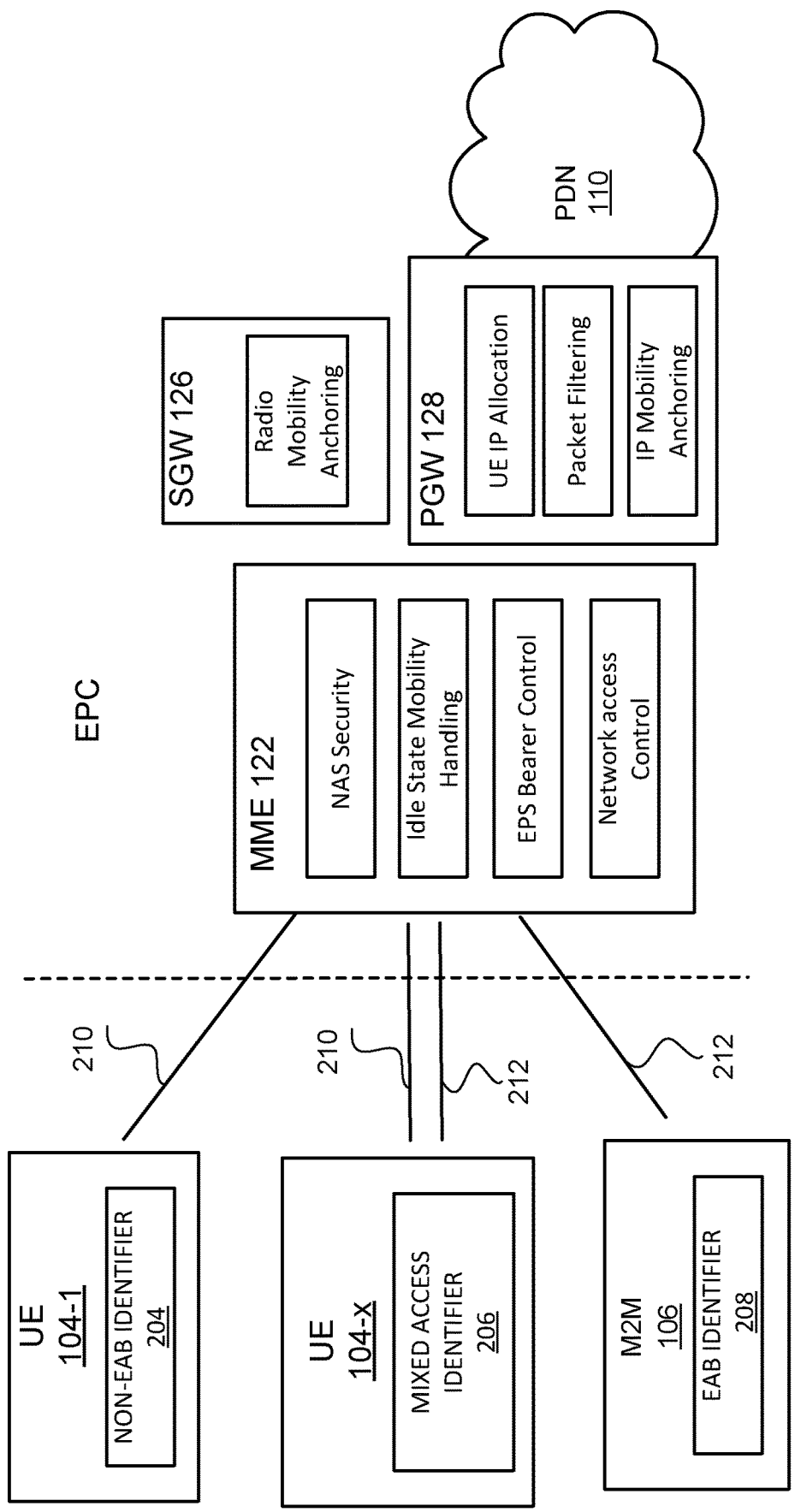
FIG. 2 is a block diagram showing identifiers associated with data use devices and related network access protocols.

FIG. 2 is a diagram showing NAS signaling based on network access classes for data use devices 102 in network 100. As shown, each data use device 102 may have an associated identifier (non-EAB identifier 204, mixed access identifier 206, EAB identifier 208) that identifies related network access classes for the data use devices 102. For example, the identifiers may be included in a Universal Subscriber Identity Module (USIM) for each of the data use devices 102. The presence and format of the non-access stratum configuration file on the USIM may be as specified in 3GPP technical specification (TS) 31.102.

Non-EAB identifier 204 may be included in one or more of the UEs 104 in network 100, for example UE 104-1. Non-EAB identifier 204 may indicate that all network access requests from the associated UEs 104 are to be allowed based on a non-EAB network access protocol 210, for all services requested by the UE 104. For example, UEs 104 may request and receive network access for time critical services such as voice calls, web browsing and streaming services. Additionally, UEs 104 may also request and receive network access for non-time critical services that are similar (and in some instances identical) in latency and other network connection requirements to M2M traffic using the non-EAB network access protocol 210. Non-time critical services may include data downloads for software updates (for updating the operating system or updating installed programs/applications) or activities such as automatic background updates of email synchronizations, social networking, weather forecasts, cloud based storage, etc., and other services which are not time critical. In some instances the non-time critical services may be initiated repeatedly by UE 104-1 without direct human intervention.

Mixed access identifier 206 may be included in one or more of the UEs 104 in network 100, for example UE 104-x. Mixed access identifier 206 may indicate that some network access requests, such as time critical applications and/or activities, from the particular UE, UE 104-x in this instance, are to be allowed based on a non-EAB network access protocol 210.

However, mixed access identifier 206 may also indicate that particular activities, such as non-time critical background activities in UE 104-x, are to follow an EAB network access protocol 212. In other words, particular activities may be designated to follow a machine type communication concept for network access, which may significantly lower the risk for network congestion. Activities that follow the EAB network access protocol 212 may be temporarily barred by network 100. Mixed access identifier 206 may classify less time critical services to follow EAB signaling and enable signaling control devices in network 100, such as MME 122, to handle a larger amount of data use devices 102 with chatty network protocols (e.g., network connection protocols that require acknowledgement prior to following transmissions) while maintaining a predetermined minimum quality of service for time critical services.

EAB identifier 208 may be included in each of the M2Ms 106. EAB identifier 208 may indicate that M2M 106 is classified in a network access class that follows an EAB network access protocol 212. Signaling devices in network 100 may signal temporary barring of M2Ms 106 based on the EAB network access protocol 212. Additionally, a separate random access channel (RACH) may be defined for the devices following EAB network access protocol 212. The RACH may provide separate (and, in many instances, higher (e.g., because of a lower relative bandwidth allocation and/or transmission reliability requirements)) access collision probability for data use devices 102 that follow EAB network access protocol 212 from data use devices 102 that follow non-EAB network access protocol 210 in network 100.

MME 122 hosts the functions for NAS signaling, NAS signaling security, idle mode UE reachability, tracking area list management, roaming, authentication, and initiating the establishment of EPS bearers between SGWs and PGWs and between SGWs and eNBs.

MME 122 may also host functions for network access control. For example, when data use device 102 makes a network access request to MME 122, or when data use device 102 is paged by MME 122 to initiate a communication setup, network access for data use device 102 may be determined (granted or barred) based on the associated identifier (e.g., for 3GPP access technologies based on a "NAS configuration", located in the USIM card). The identifier may be configured as specified in TS 31.102.

SGW 126 hosts functions for radio mobility anchoring. PGW 130 hosts functions for UE IP address allocation, packet filtering, IP mobility anchoring, and lawful interception.

Figure 3:
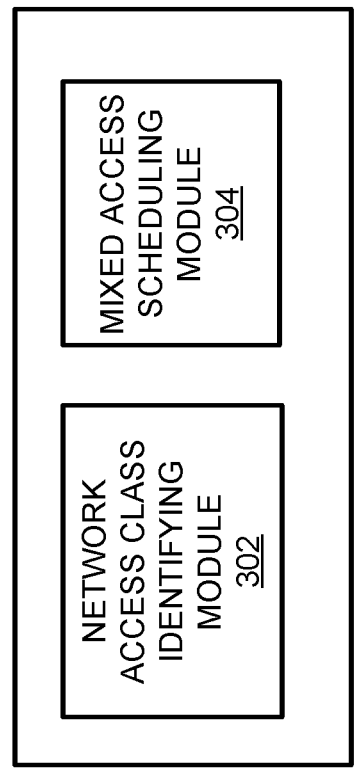
FIG. 3 is a block diagram of a network access controlling device.

FIG. 3 is a functional block diagram of a network access control device 300. Network access control device 300 may include a network access class identifying module 302, a mixed access scheduling module 304, and an access scheduling module 306. Network access control device 300 may be integrated into MME 122, or alternatively, network access control device 300 may be implemented in conjunction with MME 122 or other devices in network 100.

Network access class identifying module 302 may determine whether particular access classes are applicable for data use devices 102 based on identifiers associated with the data use devices 102. For example, network access class identifying module 302 may determine that EAB only is applicable for the data use device 102 (i.e., M2M 106). Network access class identifying module 302 may determine different network access classes for UEs 104, such as described below with respect to FIG. 6 and method 600.

Mixed access scheduling module 304 may identify particular network access protocols for applications and services associated with data use devices 102 that include mixed access identifiers 206, such UE 104-x described with respect to FIG. 2. Mixed access scheduling module 304 may simultaneously include EAB and non-EAB membership (and follow non-EAB network access protocol 210 or EAB network access protocol 212) for different associated applications and services. Mixed access scheduling module 304 may also adjust configuration of data use devices 102 to follow particular network access protocols independently of the predefined identifier (e.g., SIM information), such as specified in TS 24.368.

Figure 4:
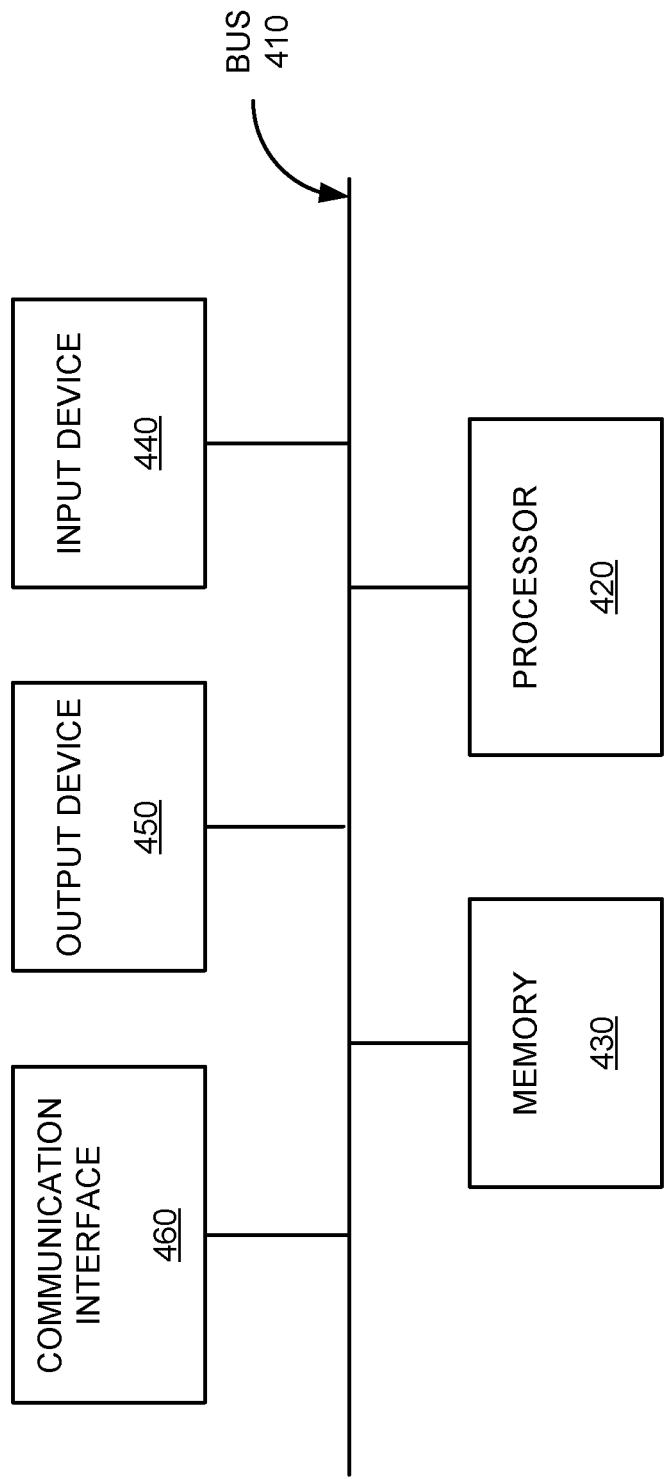
FIG. 4 illustrates an exemplary configuration of one or more of the components of FIGS. 1-3.

FIG. 4 is a diagram of exemplary components of a device 400 that may correspond to UE 104, M2M 106, one or more devices in AN 110, EPC 120, PDN 140, E-UTRAN 112, eNB 114, MME 122, HSS 124, SGW 126, PCRF 128, PGW 130, BMSC 132, and MBMS GW 134, as described in FIGS. 1-3 above. Each of UE 104, access network 104, EPC 120, PDN 140, E-UTRAN 112, eNB 114, MME 122, HSS 124, SGW 126, PCRF 128, PGW 130, BMSC 132, and MBMS GW 134 may include one or more devices 400. As shown in FIG. 4, device 400 may include a bus 410, a processor 420, a memory 430, an input device 440, an output device 450, and a communication interface 460.

Bus 410 may permit communication among the components of device 400. Processor 420 may include one or more processors or microprocessors that interpret and execute instructions. In other implementations, processor 420 may be implemented as or include one or more application specific integrated circuits (ASICs), field programmable gate arrays (FPGAs), or the like.

Memory 430 may include a random access memory (RAM) or another type of dynamic storage device that stores information and instructions for execution by processor 420, a read only memory (ROM) or another type of static storage device that stores static information and instructions for the processor 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, one or more biometric mechanisms, and the like. Output device 450 may include a device that outputs information to the operator, such as a display, a speaker, etc.

Communication interface 460 may include one or more transceivers that enables device 400 to communicate with other devices and/or systems. For example, communication interface 460 may include mechanisms for communicating with other devices, such as other devices of network 100.

As described herein, device 400 may perform certain operations in response to processor 420 executing software instructions contained in a computer-readable medium, such as memory 430. A computer-readable medium may include a non-transitory memory device. A memory device may include space within a single physical memory device or spread across multiple physical memory devices. The software instructions may be read into memory 430 from another computer-readable medium or from another device via communication interface 460. The software instructions contained in memory 430 may cause processor 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of device 400, in other implementations, device 400 may include fewer components, different components, differently arranged components, or additional components than depicted in FIG. 4. As an example, in some implementations, input device 440 and/or output device 450 may not be implemented by device 400. In these situations, device 400 may be a "headless" device that does not explicitly include an input or an output device. Alternatively, or additionally, one or more components of device 400 may perform one or more other tasks described as being performed by one or more other components of device 400.

Figure 5:
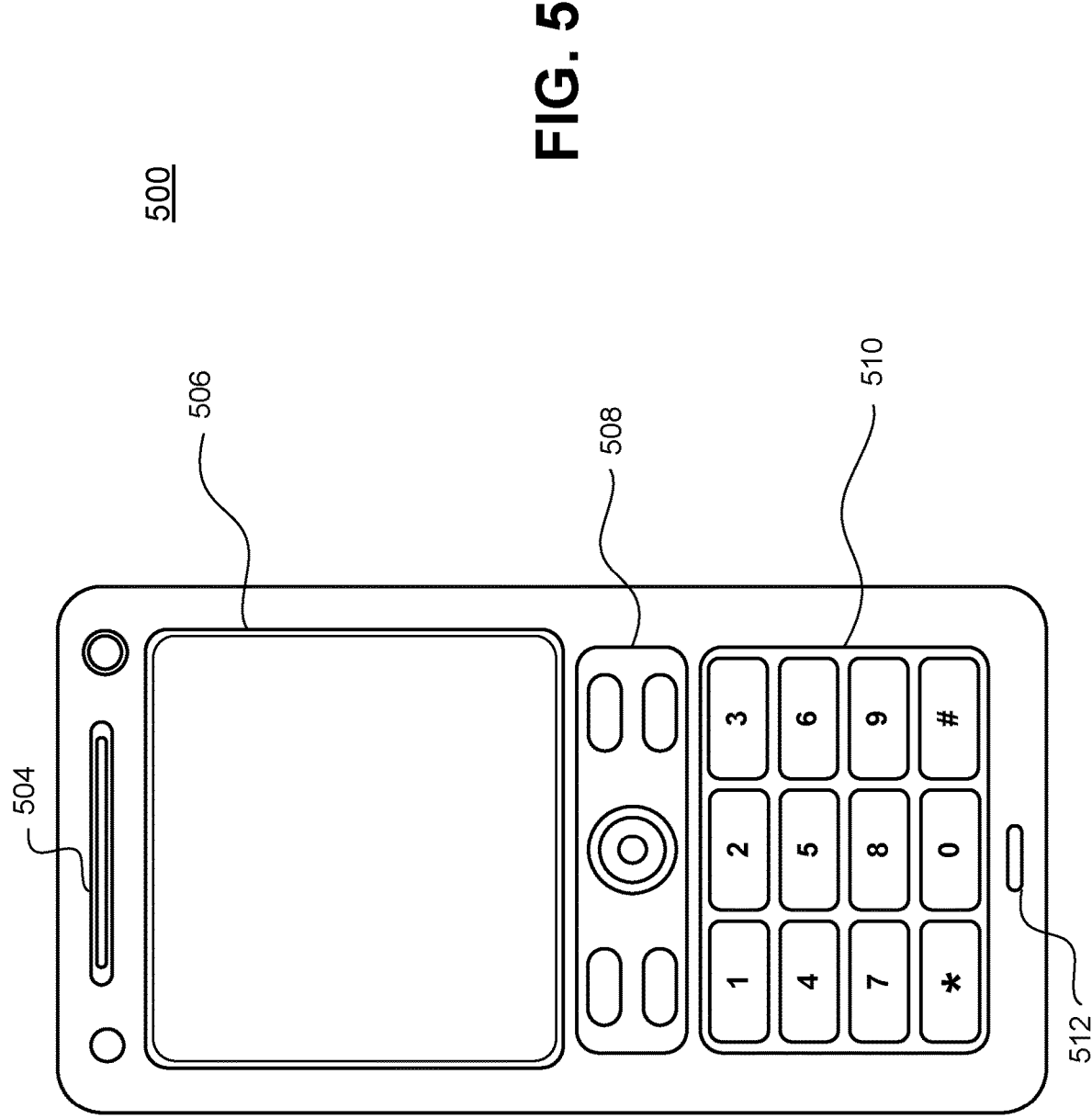
FIG. 5 is a diagram of an exemplary user device.

FIG. 5 is diagram of an exemplary user device 500, such as one or more of UEs 104, shown in FIGS. 1 and 2. As illustrated, user device 500 may include a speaker 504, a display 506, control keys 508, a keypad 510, and a microphone 512. User device 500 may include other components (not shown in FIG. 5) that aid in receiving, transmitting, and/or processing data. Moreover, other configurations of user device 500 are possible.

Speaker 504 may provide audible information to a user of user device 500. Display 506 may include a display screen to provide visual information to the user, such as video images or pictures, and may include a touch-screen display to accept inputs from the user. For example, display 506 may provide information regarding incoming or outgoing telephone calls, telephone numbers, contact information, current time, voicemail, email, etc. Display 506 may display a graphic user interface (not shown) that includes listings of available visual voicemails.

Control keys 508 may permit the user to interact with user device 500 to cause user device 500 to perform one or more operations, such as interacting with a visual voicemail application. Control keys 508 may include soft keys that may perform the functions indicated on display 506 directly above the keys. Keypad 510 may include a standard telephone keypad and may include additional keys to enable inputting (e.g., typing) information into user device 500. Microphone 512 may receive audible information from the user.

Figure 6:
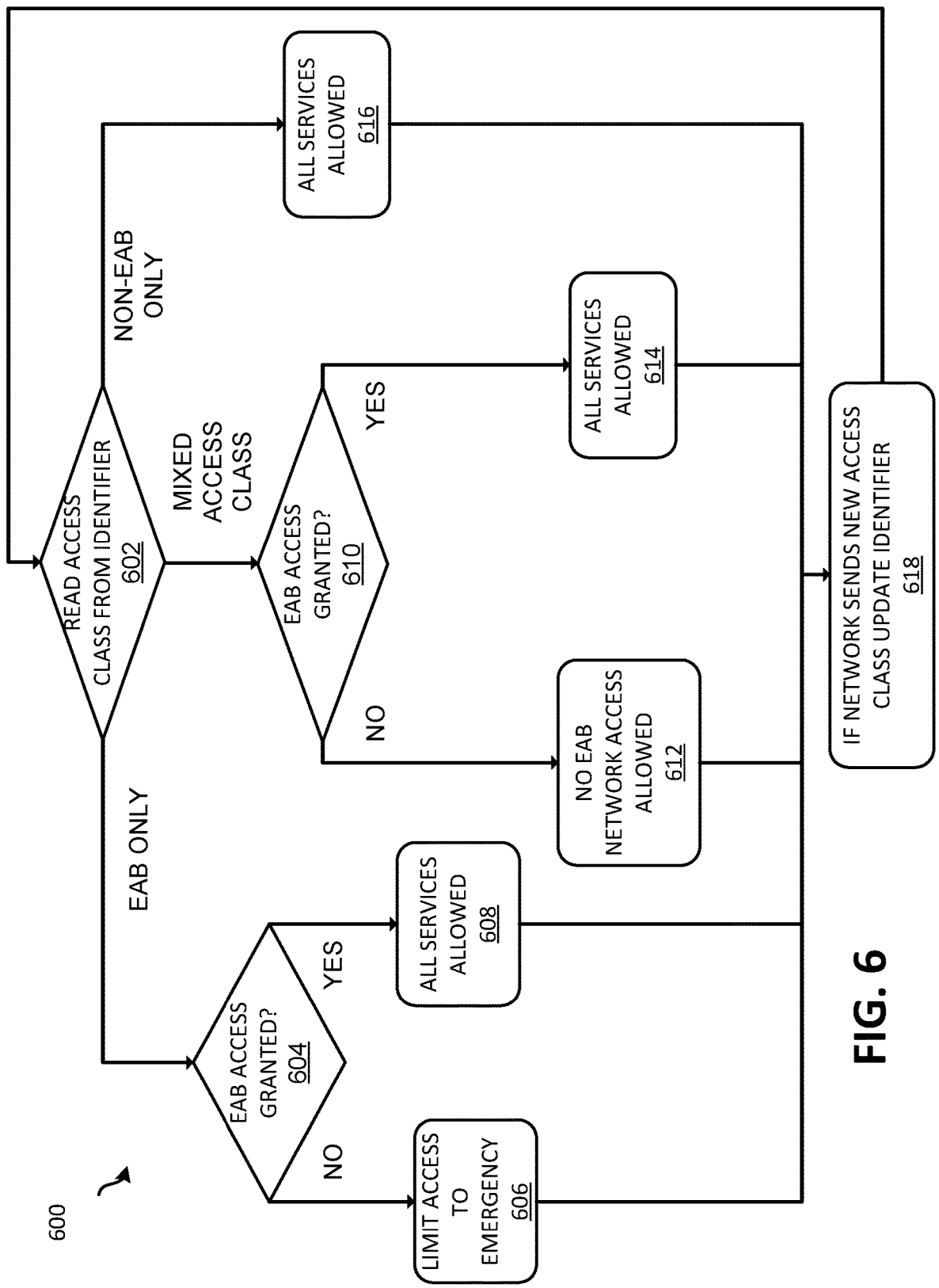
FIG. 6 is a flow diagram of an exemplary process for network controlled extended access barring of user devices.

Device 500 may generate a request for network access based on at least one service associated with device 500. Device 500 may receive a request for an identification of a network access class associated with device 500 and provide an identification of a mixed access class (e.g., based on a SIM (not shown)) associated with device 500 in response. The mixed access class includes a non-EAB network access protocol 210 for at least one service and an EAB network access protocol 212 for at least one other service for device 500. Device 500 may receive network access based on the mixed access class and the at least one service FIG. 6 is a flow chart of an exemplary process for determining network access described herein. In one implementation, process 600 may be performed by network access control device 300. In another implementation, some or all of process 600 may be performed by another device or group of devices, including or excluding network access control device 300.

Process 600 may start when network access control device 300 reads an identifier for an access class of data use device 102 (block 602). For example, at network attach, data use device 102 may signal a network access class associated with data use device 102 to network access control device 300 in order to indicate one or more associated network access protocols for data use device 102, e.g., if data use device 102 is an EAB device (i.e., in an EAB only access class) that communicates using an EAB network access protocol 212, a non-EAB device (i.e., in a non-EAB only access class) that communicates using a non-EAB network access protocol 210, or a mixed access class device (i.e., in a mixed access class) that communicates using a mixed access class protocol, i.e., EAB network access protocol 212 for some services and non-EAB network access protocol 210 for other services. Network access control device 300 may receive information from a SIM card of data use device 102 that includes an identifier of the network access class for the data use device 102.

At block 604, if the network access protocol for the data use device 102 is an EAB network access protocol 212 (i.e., the data use device 102 receives access based on EAB only) (block 602, EAB only), network access control device 300 may determine whether EAB access has been granted for the data use device 102. EAB access may be granted in network 100 at predetermined intervals or based on current or projected network capacity or transaction volume in network 100 (or parts of communication channels in network 100, such as RACH, described above). In this case data use device 102 is an EAB only device and is considered as an M2M 106.

If EAB access has not been granted (block 604, no), network access control device 300 may limit access to network 100 to emergency calls for (to/from) data use device 102 (block 606). If EAB access has been granted (block 604, yes), network access control device 300 may allow network access for data use device 102 for all services (block 608).

At block 610, if the network access protocol for the data use device 102 is a mixed access class (block 602, mixed access class), network access control device 300 may determine whether EAB access has been granted for the data use device 102.

If EAB access has not been granted (block 610, no), network access control device 300 may limit network access to network 100 to services associated with data use device 102 that are non-EAB only (i.e., network access control device 300 may bar network access for EAB services) (block 612).

If EAB access has been granted (block 610, yes), network access control device 300 may allow the data use device 102 network access for all services (block 614). According to an example network access control device 300 may support a separate PDP context for EAB services.

As shown in blocks 610 to 614, network access control device 300 may provide simultaneous EAB and non-EAB classification of services from a same data use device 102. In these instances, data use device 102 may follow general access restrictions for time-critical and high priority services associated with network 100, while data connections from less time critical background services are only initiated by data use device 102 if EAB restrictions allow and follows EAB random access procedures.

At block 616, if the network access protocol for the data use device 102 is non-EAB only (block 602, non-EAB only), network access control device 300 may allow the data use device 102 network access for all services.

At block 618, network access control device 300 may modify the data use device 102 SIM data by means of device management as specified in TS 24.368.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. For example, machine type communication may be allowed for individual or subclasses of data use devices 102 (e.g., medical equipment on network 100) or for all data use devices 102 that use machine type communication (i.e., all EAB devices).

For example, while series of blocks have been described with respect to FIG. 6, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

It should be emphasized that the term "comprises/comprising" when used in this specification is taken to specify the presence of stated features, integers, steps or components but does not preclude the presence or addition of one or more other features, integers, steps, components, or groups thereof.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

The invention claimed is:

1. A computer-implemented method comprising:
   determining, by a data use device in a network, by reading an identifier, whether the data use device follows a non-extended access barring (EAB) network access protocol for a first service and an EAB network access protocol for a second service;
   determining, by the data use device, whether EAB access has been granted in the network, and upon determining that the data use device follows a non-EAB network access protocol for the first service and an EAB network access protocol for the second service:
      upon determining that EAB access has not been granted, the data use device does not initiate network access requests of the second service and initiates network access requests of the first service; and
      upon determining that EAB access has been granted, the data use device initiates all network access requests.

2. The computer-implemented method of claim 1, further comprising:
   receiving, by the data use device, an updated identifier; and
   updating the identifier in the data use device.

3. The computer-implemented method of claim 1, further comprising:
   determining, by the data use device, by reading the identifier, whether the data use device follows an EAB network access protocol for all services, and upon determining that the data use device follows an EAB network access protocol for all services:
      upon determining that EAB access has not been granted, the data use device does not initiate network access requests of the first service or the second service; and
      upon determining that EAB access has been granted, the data use device initiates all network access requests.

4. The computer-implemented method of claim 1, wherein the identifier is stored on a subscriber identity module associated with the data use device.

5. The computer-implemented method of claim 1, wherein the first service comprises a time-critical service and the second service comprises a non-time critical service.

6. The computer-implemented method of claim 1, further comprising:
   Coordinating a separate packet data protocol (PDP) connection with a packet data network (PDN) for each network access protocol.

7. The computer-implemented method of claim 1, further comprising:
assigning a separate random access channel for services following the EAB network access protocol.

8. The computer-implemented method of claim 1, wherein the network is a third generation partnership project (3GPP) network.

9. The computer-implemented method of claim 1, wherein the data use device is one of a wireless telephone, a cellular telephone, a smart phone, a personal digital assistant (PDA), a laptop computer, a personal computer, or a tablet computer.

10. A data use device that is part of a network, the data use device comprising:
a memory to store a plurality of instructions; and
a processor configured to execute instructions in the memory to:
determine, by reading an identifier, whether the data use device follows a non-extended access barring (EAB) network access protocol for a first service and an EAB network access protocol for a second service;
determine whether EAB access has been granted in the network, and upon determining that the data use device follows a non-EAB network access protocol for the first service and an EAB network access protocol for the second service:
upon determining that EAB access has not been granted, the data use device not initiating network access requests of the second service and initiating network access requests of the first service; and
upon determining that EAB access has been granted, the data use device initiating all network access requests.

11. The data use device of claim 10, wherein the processor is further configured to execute instructions in the memory to:
receive an updated identifier; and
update the identifier in the data use device.

12. The data use device of claim 10, wherein the processor is further configured to execute instructions in the memory to:
determine, by reading the identifier, whether the data use device follows an EAB network access protocol for all services, and upon determining that the data use device follows an EAB network access protocol for all services:
upon determining that EAB access has not been granted, the data use device not initiating network access requests of the first service and the second service; and
upon determining that EAB access has been granted, the data use device initiating all network access requests.

13. The data use device of claim 10, wherein the identifier is stored on a subscriber identity module associated with the data use device.

14. The data use device of claim 10, wherein the processor is further configured to:
coordinate a separate packet data protocol (PDP) connection with a packet data network (PDN) for each network access protocol.

15. The data use device of claim 10, wherein the processor is further configured to:
assign a separate random access channel for services that receive network access based on the EAB network access protocol.

16. The data use device of claim 10, wherein the network is a third generation partnership project (3GPP) network.

17. A non-transitory computer-readable medium including instructions to be executed by a processor, the instructions including one or more instructions, when executed by the processor, for causing the processor to:
determine, by reading an identifier, whether a data use device follows a non-extended access barring (EAB) network access protocol for a first service and an EAB network access protocol for a second service;
determine whether EAB access has been granted in the network, and upon determining that the data use device follows a non-EAB network access protocol for the first service and an EAB network access protocol for the second service:
upon determining that EAB access has not been granted, the data use device not initiating network access requests of the second service and initiating network access requests of the first service; and
upon determining that EAB access has been granted, the data use device initiating all network access requests.

18. The non-transitory computer-readable medium of claim 17, further comprising instructions for causing the processor to:
receive an updated identifier; and
update the identifier in the data use device.

19. The non-transitory computer-readable medium of claim 17, further comprising instructions for causing the processor to:
determine, by reading the identifier, whether the data use device follows an EAB network access protocol for all services, and upon determining that the data use device follows an EAB network access protocol for all services:
upon determining that EAB access has not been granted, the data use device not initiating network access requests of the first service and the second service; and
upon determining that EAB access has been granted, the data use device initiating all network access requests.

20. The non-transitory computer-readable medium of claim 17, further comprising instructions for causing the processor to:
receive the identifier associated with the data use device, the identifier stored on a subscriber identity module (SIM) associated with the data use device.

* * * * *